US008610020B2

(12) United States Patent
Franzone et al.

(10) Patent No.: US 8,610,020 B2
(45) Date of Patent: Dec. 17, 2013

(54) METHOD FOR SORTING POSTAL OBJECTS

(75) Inventors: Cristiano Franzone, Genoa (IT); Guido Teodoro De Leo, Genoa (IT)

(73) Assignee: Elsag Datamat SpA, Genoa (IT)

( * ) Notice: Subject to any disclaimer, the term of this patent is extended or adjusted under 35 U.S.C. 154(b) by 280 days.

(21) Appl. No.: 13/051,949

(22) Filed: Mar. 18, 2011

(65) Prior Publication Data

US 2011/0226678 A1 Sep. 22, 2011

(30) Foreign Application Priority Data

Mar. 19, 2010 (EP) .................................... 10425081

(51) Int. Cl.
*G06K 9/00* (2006.01)

(52) U.S. Cl.
USPC ............ 209/584; 209/509; 209/552; 209/900

(58) Field of Classification Search
USPC ................................. 209/509, 552, 584, 900
See application file for complete search history.

(56) References Cited

U.S. PATENT DOCUMENTS

| | | | | |
|---|---|---|---|---|
| 5,119,954 | A * | 6/1992 | Svyatsky et al. | 209/584 |
| 5,190,282 | A * | 3/1993 | Rabindran et al. | 271/272 |
| 6,762,384 | B1 * | 7/2004 | Kechel | 209/584 |
| 2008/0093274 | A1 * | 4/2008 | Stemmle | 209/584 |
| 2011/0226678 | A1 * | 9/2011 | Franzone et al. | 209/509 |

FOREIGN PATENT DOCUMENTS

| | | |
|---|---|---|
| DE | 19625007 | 1/1998 |
| EP | 0804975 | 11/1997 |
| EP | 1736250 | 12/2006 |
| WO | WO 2006/020750 | 2/2006 |

OTHER PUBLICATIONS

European Search Report from European Patent Application No. 10425081 dated Jul. 22, 2010.

* cited by examiner

*Primary Examiner* — Terrell Matthews
(74) *Attorney, Agent, or Firm* — Workman Nydegger

(57) ABSTRACT

A method including treating packs of overlapping postal objects for generating singulated postal objects, directing each postal object towards a respective outlet selected from among a number n of selectable outlets. The method includes performing a first sorting step, accumulating, within an i-th selected outlet, postal objects belonging to K subgroups having homogeneous delivery points, and carrying out a step of re-processing the previously sorted postal objects, whereby the postal objects taken from the outlets are treated for forming ordered sets of postal objects, each set comprising the postal objects belonging to a respective homogeneous subgroup and being formed by postal objects ordered according to successive delivery points; and performing a second step of sorting ordered sets, on the basis of which the postal objects that have corresponding positions within each subgroup are sent to the respective outlets. The objects are accumulated according to successive delivery points in the outlets.

8 Claims, 7 Drawing Sheets

METHOD FOR SORTING POSTAL OBJECTS

CROSS-REFERENCE TO RELATED APPLICATIONS

This application claims priority to European Patent Application No. 10425081.6 filed Mar. 19, 2010, the disclosure of which is incorporated herein by this reference.

TECHNICAL FIELD

Embodiments of the present invention relate to a method and to a device for sorting postal objects.

BACKGROUND

Devices for sorting plane rectangular postal objects (letters, postcards, documents in envelopes, magazines, etc.) are known, which comprise:

- a module for acquisition and singulation of postal objects, which receives at input packs (also referred to as files) of postal objects and is designed to generate at output singulated postal objects, i.e., ones physically separated from each other; and
- a sorting device, coupled at input with an outlet of the acquisition and singulation module and designed to address, by means of appropriate exchanges, each singulated postal object received at input towards a respective outlet belonging to a series of accumulation outlets with which the sorting module is provided.

The sorting device is designed to perform operations of sending of the postal objects to the outlets, said operations being designed to enable, following upon execution of an initial step and a final step, formation in the outlets of groups of postal objects that are sequenced, i.e., ordered according to successive delivery points.

As is known, the sequenced postal objects can be conveniently delivered in succession by a postman, who proceeds along a postal path in which the delivery points are physically located.

It may be shown that for a sorting device provided with n physical separations (stacker, bin, container outlets etc.) n*n delivery points can be sequenced in two passes or steps (for example, said initial step and final step).

Known solutions envisage the interposition of an intermediate sequencing step between the initial one and the final one. In known solutions, this requires that at least all the mail regarding the additional addresses, which may be the majority, must be:

- fed onto the sorting system, hence requiring additional processing time; and
- buffered within the sorting system, which comprises, in this case, accessory pigeon-holes for ordered housing of the sorted mail, up to the end of the intermediate sorting step, this requiring a considerable storing capacity.

SUMMARY

One or more embodiments of the present invention provide a method and device that enables an increase of the delivery points that can be sequenced by a factor hereinafter defined as "magnification".

One or more embodiments of the present invention relate to a method for sorting postal objects. One or more embodiments of the present invention also relate to a device for sorting postal objects.

BRIEF DESCRIPTION OF THE DRAWINGS

Embodiments of the invention will now be illustrated with particular reference to the attached figures in which.

DETAILED DESCRIPTION

Figure 1:
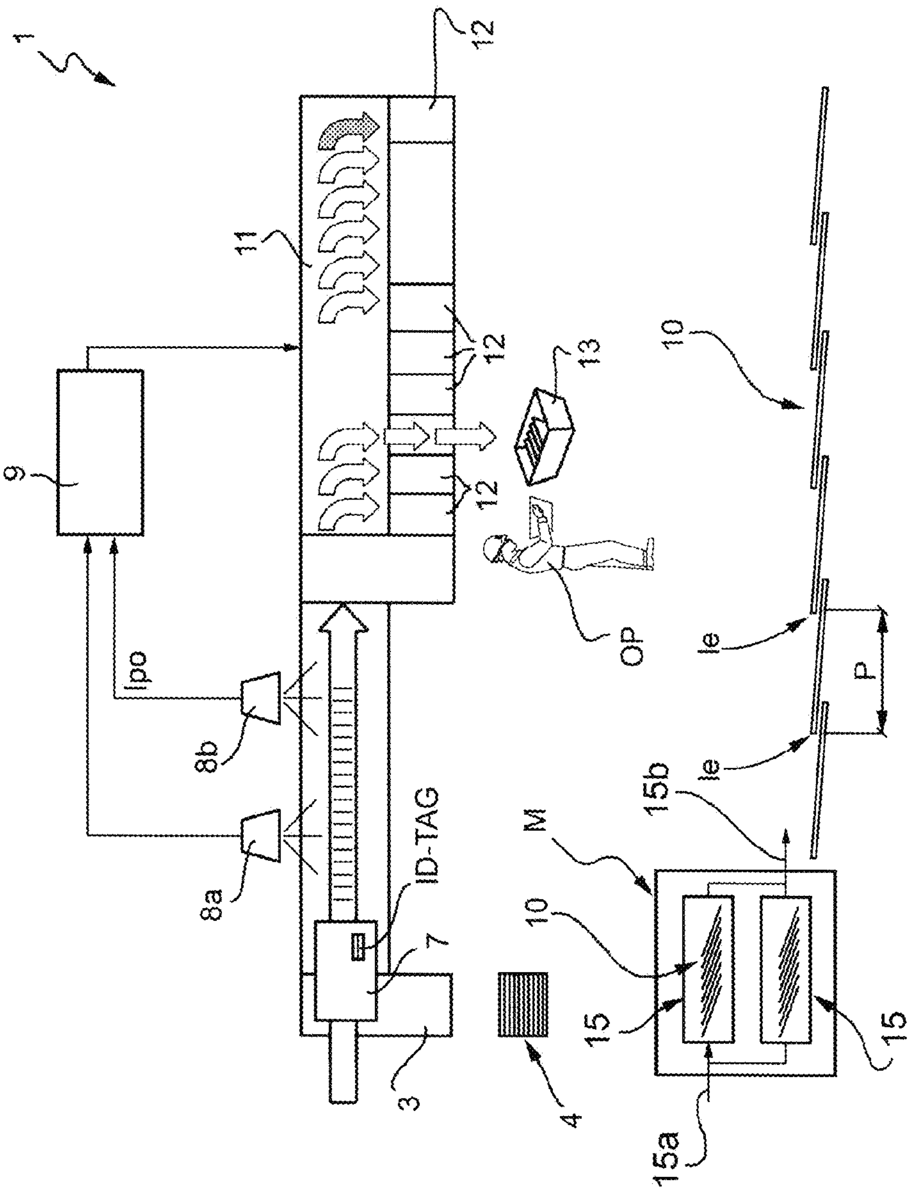
FIG. 1 is a schematic illustration of a sorting device implementing the method according to an embodiment of the present invention.

Designated as a whole by 1 in FIG. 1 is a device for sorting postal objects that operates according to a method according to an embodiment of the present invention.

The device 1 comprises a module for acquisition and singulation of postal objects 3 operating according to known technologies (and consequently not described in detail hereinafter), which receives at input parallelepipedal packs 4 of plane rectangular postal objects 7 set on top of one another (letters, postcards, documents in envelopes, etc.) (not represented in scale) and is designed to generate at output singulated postal objects, i.e., ones physically separated from each other.

Figure 4:
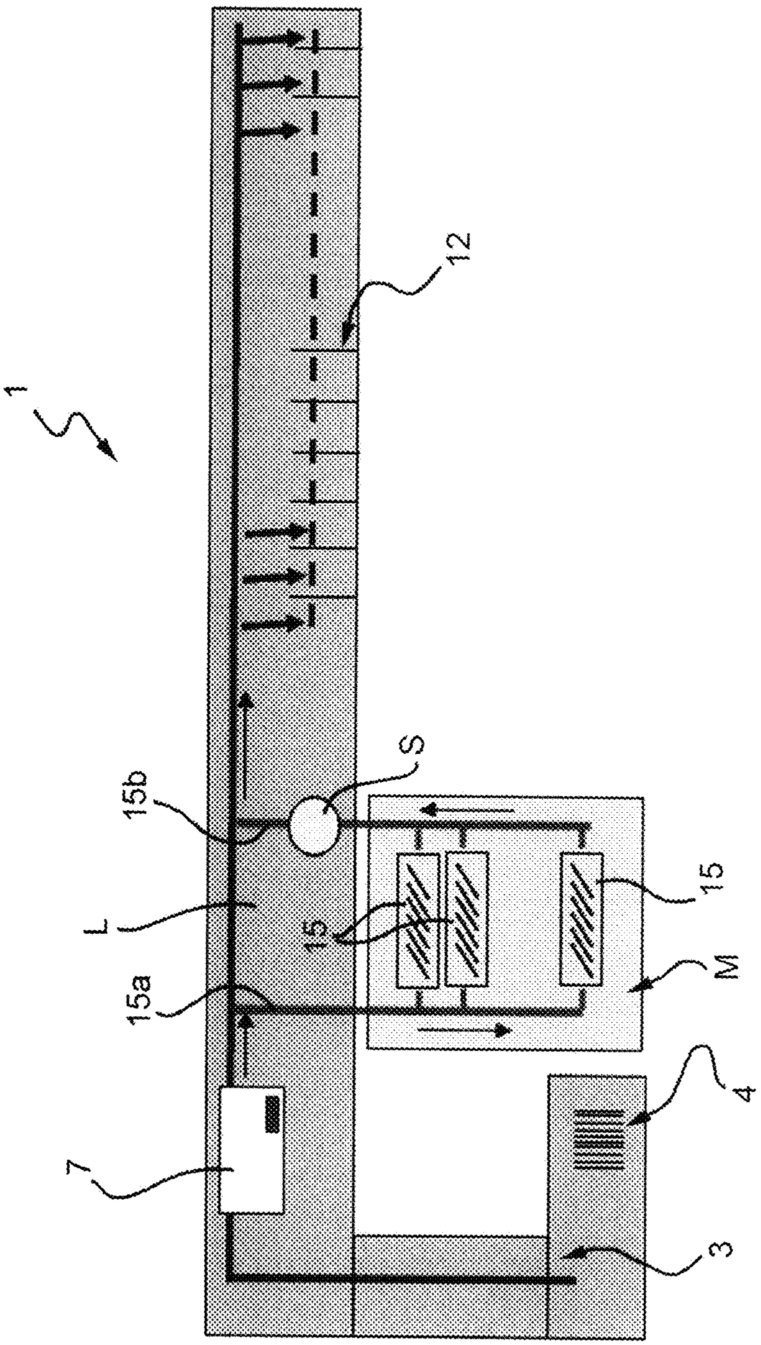
FIGS. 4, 5 and 6 represent in detail the use of the sorting device in the course of the operations illustrated in the block diagram of FIG. 2.
Figure 5:
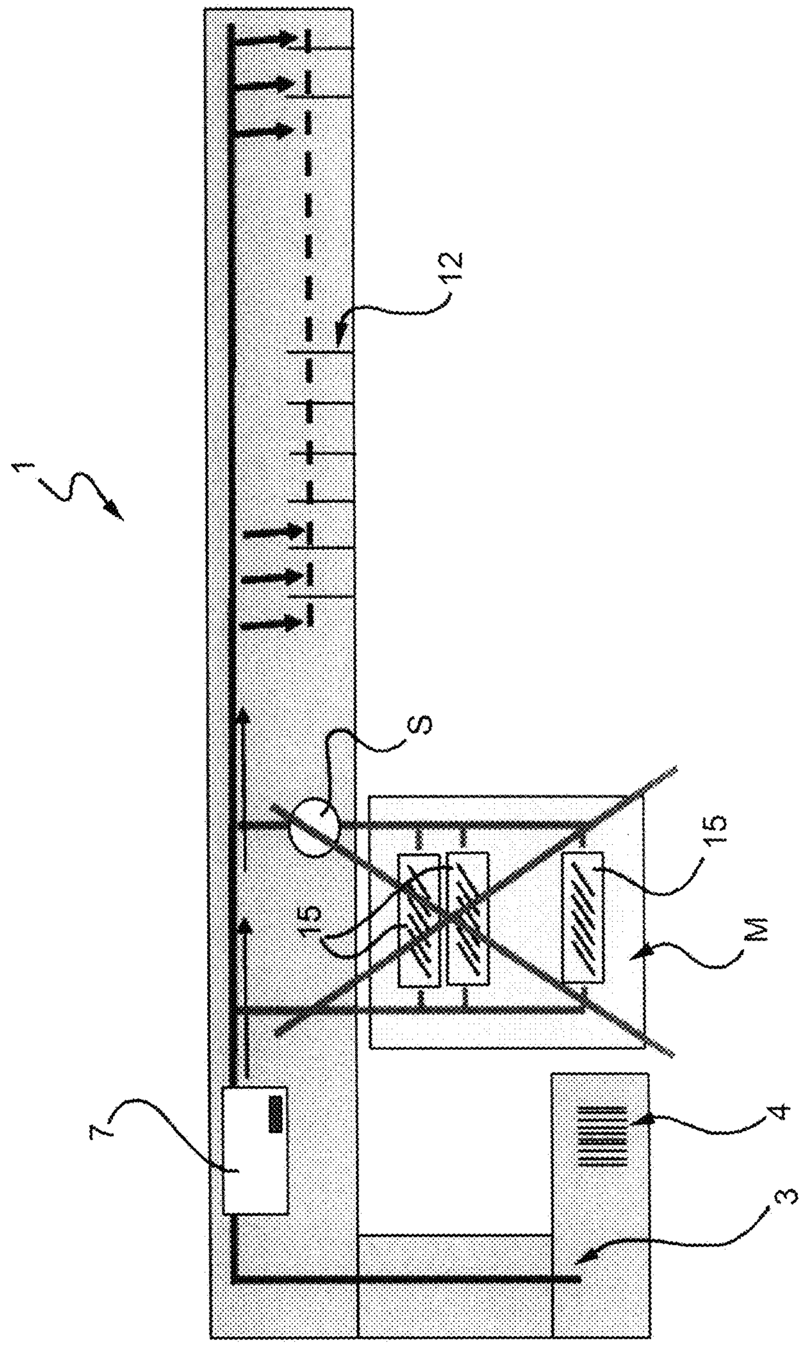
Figure 6:
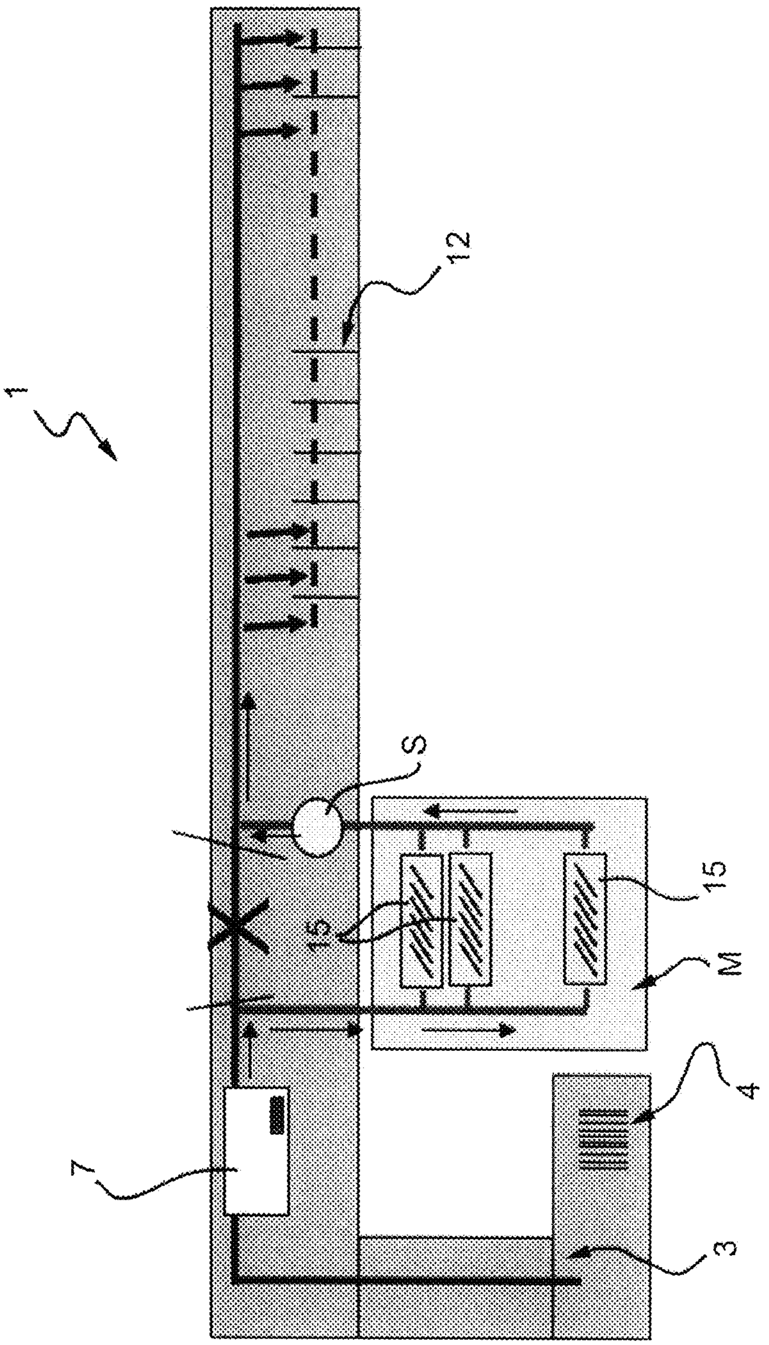

The module 3 for acquisition and singulation of postal objects is provided with a first read device 8*a* ((of a known type) not illustrated for reasons of simplicity in FIGS. 4, 5 and 6), designed to recognize a unique identifier ID_TAG (for example, a barcode) present on each singulated postal object 7; the information associated to the unique detected identifier ID_TAG is transmitted to an electronic control unit 9 of the device 1. The read device 8*a* can be associated to a second read device 8*b* ((of a known type) not illustrated for reasons of simplicity in FIGS. 4, 5 and 6), conveniently designed to detect a two-dimensional grey-level image $I_{po}$ of the postal object 7; said image $I_{po}$ can be processed via automatic coding systems (optical character recognition OCR) implemented in the control unit 9 or else via manual coding systems (VCD) for reading the address present on the postal object 7.

The acquisition and singulation module 3 is designed to address each singulated postal object 7 received at input along a path L from which the postal object can reach a respective outlet 12 (which can be selected by means of swapping devices of a known type arranged along the path L (not illustrated)), in which the postal objects accumulate typically, but not exclusively, within a stacker of a known type and are subsequently transferred by the operator into a container 13 for mail. The device 11 is provided with a large number of n outlets, for example, n=200 (two hundred) outlets 12. Typically, each outlet 12 is associated to a postal destination or to a set of postal destinations.

The outlets 12 are set alongside one another and are associated to respective outlet logic indicators E1, E2, . . . Ei, En.

The selection of the outlet 12 is made by the unit 9 by means of a sorting program that uses the information associated to the two-dimensional image $I_{po}$ of the postal object and/or to the unique identifier ID_TAG for selecting an outlet logic indicator E1, E2, . . . Ei, E20 and hence routing a postal object towards said outlet.

The device 1 further comprises a magnifier device M (represented schematically in FIG. 1), which comprises at least one device 15 for forming groups 10 of overlapping postal objects provided with an inlet 15*a* and an outlet 15*b*. The device 15 for forming groups 10 of overlapping postal objects is designed to form, by means of known techniques, groups of aligned, overlapping, postal objects, i.e., ones arranged with their corresponding front edges of minor side set apart from one another by a pitch P, the value of which basically depends upon the length and thickness of the postal object (FIG. 1).

For example, the forming device 15 can be obtained according to what is described in the European patent No. EP-B-0804975 and comprises a plurality of formation units, each of which comprises a pair of facing belts, which extend in contact with one another along a substantially rectilinear path that extends between an inlet area (inlet 15*a*) in which the belts come into contact with one another and an outlet area (outlet 15*b*) in which the belts separate. The belts move in concordant directions and at constant pitch under the thrust of a motor device that is activated by a postal object 7 launched into the inlet area so that it enters between the two overlapping belts; the repetition of said operations of entry of the postal object between the two belts and of pre-set displacement forms a set of overlapping postal objects that extend along said path and have their respective front edges separated from one another by a pre-defined spacing.

Figure 2:
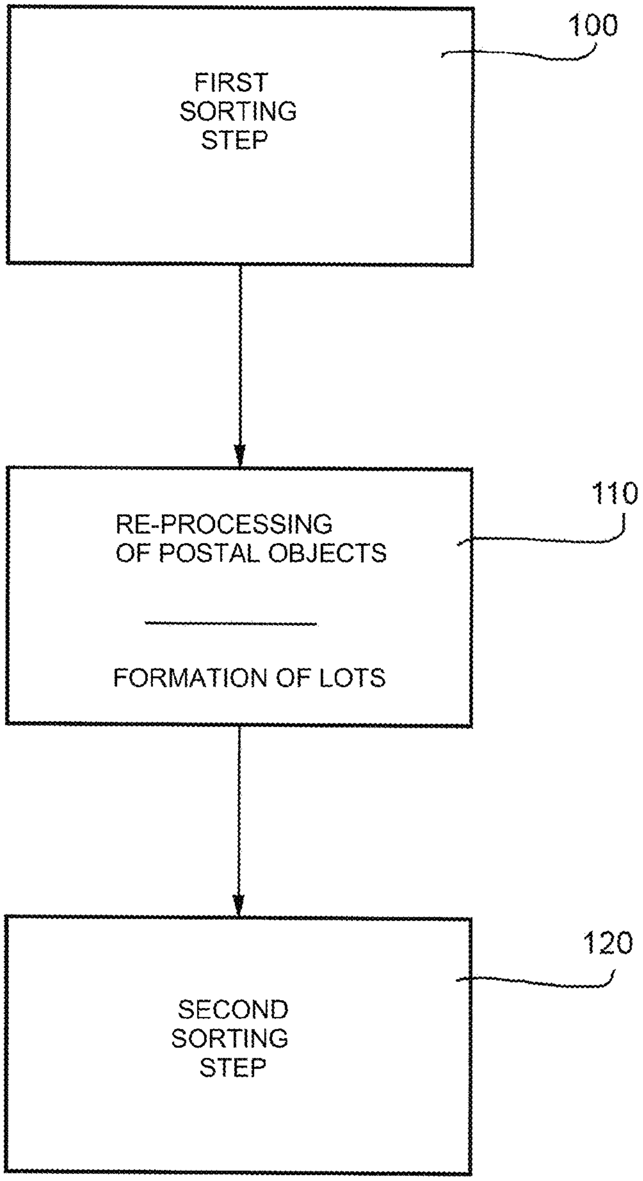
FIG. 2 illustrates a block diagram of the operations of the method according to an embodiment of the present invention.

According to an embodiment of the present invention, the sorting operations take place as indicated hereinafter (FIG. 2).

A first sorting step (block 100—initial step) is performed, according to which, directed into each outlet 12 are the postal objects belonging to a number K of subgroups having homogeneous delivery points, with K that is an integer equal to or greater than two. As will be clarified hereinafter, the number K represents a magnification factor that determines an increase in the number of delivery points that can be obtained.

Sorting of a first outlet with K=3 will be exemplified, where three subgroups of postal objects having homogeneous delivery points are formed.

In this case, the first subgroup is formed by the postal objects associated to the following delivery points: 1,3n+1, 3*2n+1,3*3n+1, . . . 3*(j−1)*n+1

The second subgroup is formed by the postal objects associated to the following delivery points: 2,3n+2,3*2n+2, 3*3n+2, . . . 3*(j−1)*n+2

The third subgroup is formed by the postal objects associated to the following delivery points: 3,3n+3,3*2n+3,3*3n+ 3, . . . 3*(j−1)*n+3.

where n is the maximum number of the outlets of the sorting device for the first sorting step (initial step), and j is an indicator of the maximum number of the outlets used in a second step (final step).

Figure 3A:
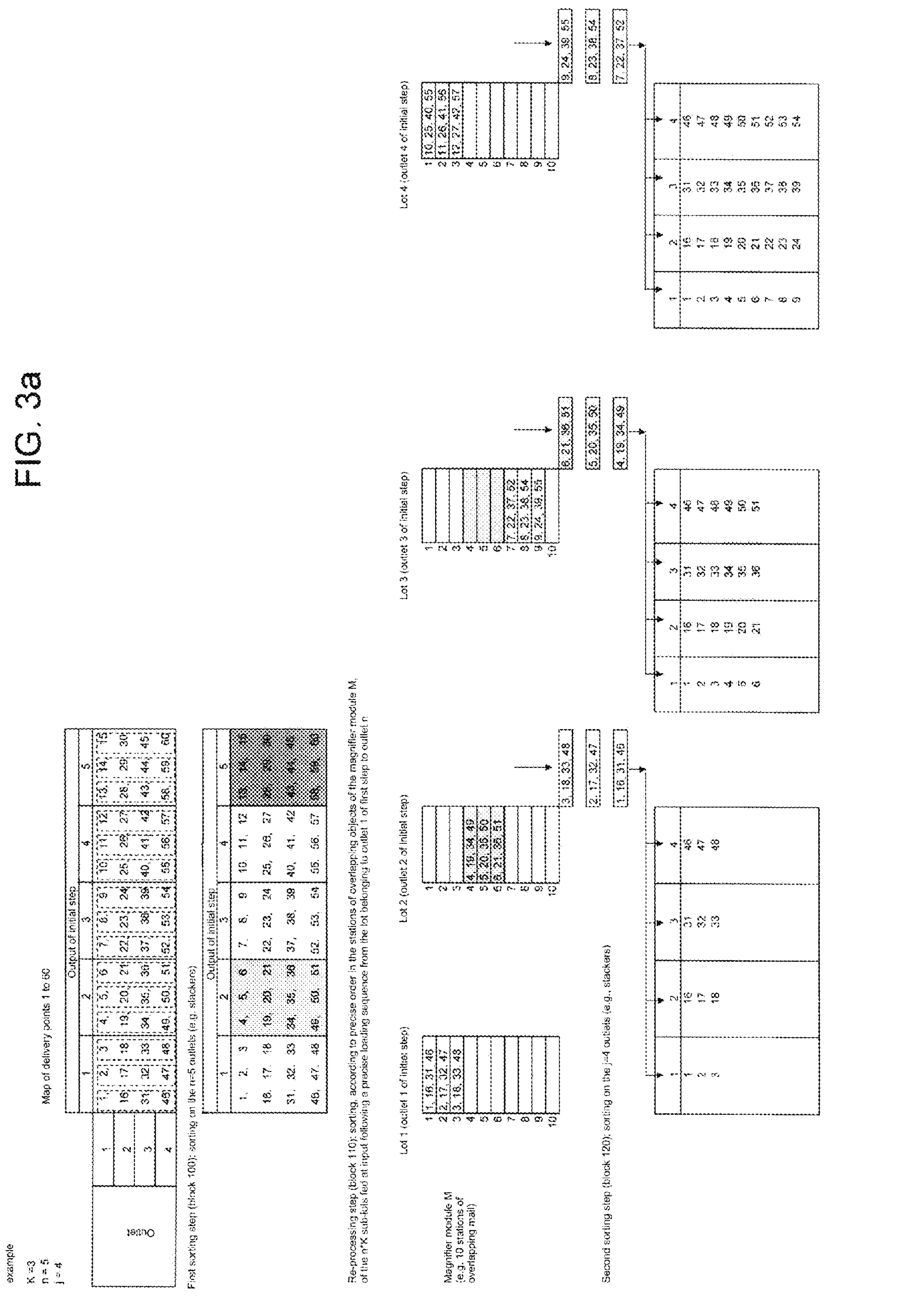
FIGS. 3*a* and 3*b* are a schematic illustration of operations performed by the device according to an embodiment of the present invention.
Figure 3B:
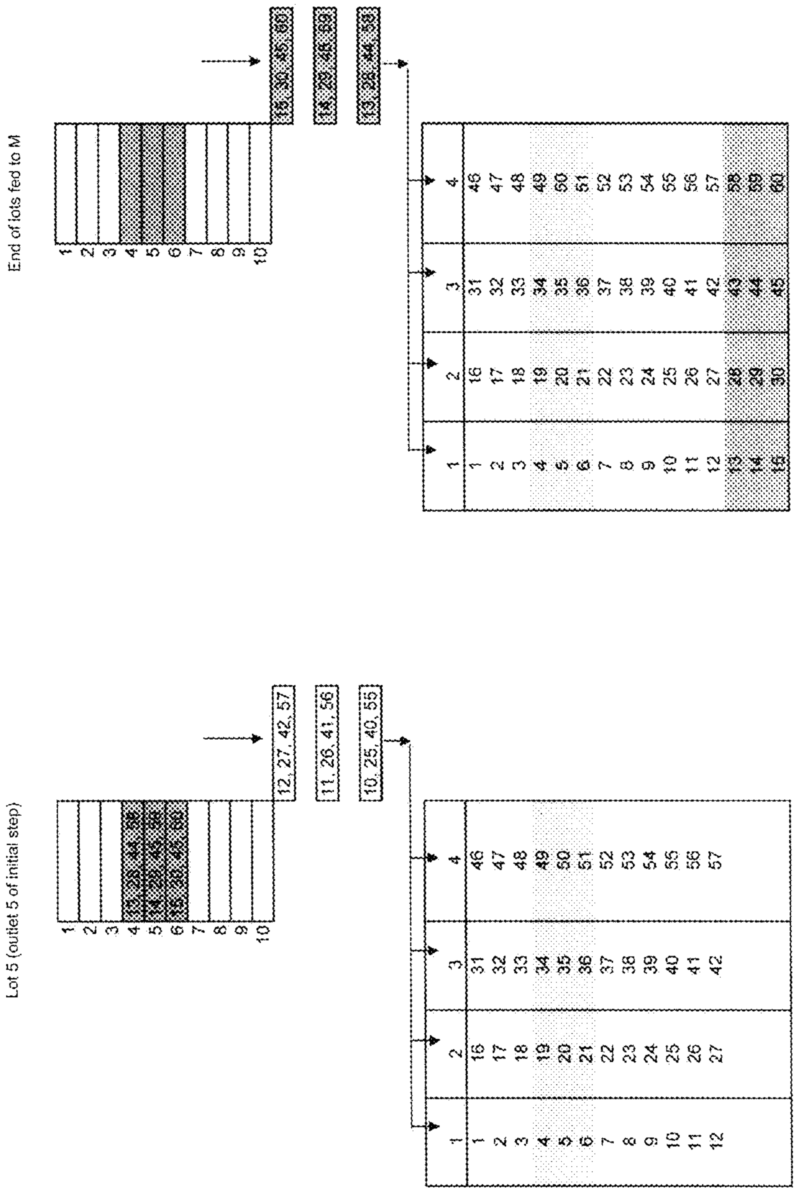

Represented schematically in FIGS. 3*a*, 3*b* are the outlets of the device following upon the first step in the case where K=3, n=5 and j=4.

In other words, according to the first sorting step, postal objects belonging to K subgroups are accumulated in an i-th outlet; the delivery points of each subgroup can be for example defined as:

(L),nK+(L),2nK+(L),3nK+(L), . . . (j−1)*nK+(L).

where:

- n is the maximum number of the outlets of the sorting device 11 for the first sorting step (initial step);
- j is an indicator of the maximum number of the outlets used in a second step (final step);
- (L) is one of the consecutive values {k+(i−1)*K}, where k is the numeral of the subgroup and may assume one of the integer values between 1 and K;
- K is the magnification factor represented by an integer equal to or greater than two;
- i is the numeral of the outlet.

For example, for i=1 (first outlet) we have:

for k=1, (first subgroup) L=1, and hence:

delivery points of first subgroup: 1,3n+1,3*2n+1,3*3n+1, . . . 3*(j−1)*n+1 for k=2, (second subgroup) L=2, and hence:

delivery points of second subgroup: 2,3n+2,3*2n+2,3*3n+2, . . . 3*(j−1)*n+2 for k=3 (third subgroup) L=3, and hence:

delivery points of third subgroup: 3,3n+3,3*2n+3,3*3n+3, . . . 3*(j−1)*n+3

Moreover for i=2 (second outlet) we have:

for k=1, (first subgroup) L=4, and hence:

delivery points of first subgroup accumulated in the second outlet:

4,3n+4,3*2n+4,3*3n+4, . . . 3*(j−1)*n+4 for k=2, (second subgroup) L=5, and hence:

delivery points of second subgroup accumulated in the second outlet:

5,3n+5,3*2n+5,3*3n+5, . . . 3*(j−1)*n+5 for k=3 (third subgroup) L=6, and hence:

delivery points of third subgroup accumulated in the second outlet 6,3n+6,3*2n+6,3*3n+6, . . . 3*(j−1)*n+6

Likewise for i=3 (third outlet) we have:

for k=1, (first subgroup) L=7, and hence:

delivery points of first subgroup accumulated in the third outlet:

7,3n+7,3*2n+7,3*3n+7, . . . 3*(j−1)*n+7 for k=2, (second subgroup) L=8, and hence:

delivery points of second subgroup accumulated in the third outlet:

8,3n+8,3*2n+8,3*3n+8, . . . 3*(j−1)*n+8 for k=3 (third subgroup) L=9, and hence:

delivery points of third subgroup accumulated in the third outlet 9,3n+9,3*2n+9,3*3n+9, . . . 3*(j−1)*n+9

Finally, for the n-th outlet (i=n) we have i=n: L=k+(n−1)*K=k+nK−K

Hence, for K=3 we have:

for k=1, (first subgroup) L=1+nK−K=1+3n−3=3n−2, and hence:

delivery points of first subgroup accumulated in the n-th outlet:

3n−2,6n−2,9n−2,12n−2, . . . , 3j*n−2.

for k=2, (second subgroup) L=2+nK−K=2+3n−3=3n−1, and hence:

delivery points of second subgroup accumulated in the n-th outlet:

3n−1,6n−1,9n−1,12n−1, . . . , 3j*n−1.

for k=3, (third subgroup) L=3+nK−K=3+3n−3=3n, and hence:

delivery points of third subgroup accumulated in the n-th outlet:

3n,6n,9n,12n, . . . , 3j*n

At the end of the first sorting step (block 100) described above, a step of re-processing of the postal objects is executed (block 110), whereby the postal objects are taken from the outlets 12 and fed to the inlet of the magnifier module M, where the device for forming groups 10 forms K*n ordered lots of overlapping postal objects, each lot being formed by a respective homogeneous re-ordered subgroup, i.e., formed by ordered postal objects (i.e., arranged overlapping one another) according to successive delivery points:

first lot=1, Kn+1,2Kn+1,3Kn+1, . . . (j−1)* K*n+1
second lot=2, Kn+2,2Kn+2,3Kn+2, . . . (j−1)* K*n+2
third lot=3, Kn+3,2Kn+3,3Kn+3, . . . (j−1)* K*n+3
fourth lot=4, Kn+4,2Kn+4,3*Kn*+4, . . . (j−1)* K*n+4
fifth lot=5, Kn+5,2Kn+5,3Kn+5, . . . (j−1)* K*n+5
K*n-th lot=Kn, Kn+Kn, 2Kn+Kn, 3Kn+Kn, . . . (j−1)*K*n+Kn Withdrawal of the postal objects from the outlets of the sorter device 11 and their re-introduction into the magnifier M for forming lots is carried out according to a pre-set order, i.e., starting from the outlet of lower order (first outlet containing the first lot) and then passing to the outlet of subsequent order (second outlet containing the second lot), and so forth up to the outlet of highest order (n-th outlet).

A sequence-verification step is in any case performed, designed to check whether withdrawal and loading into the magnifier M of the groups of postal objects respects the order pre-set by the outlets (i.e., first lot, second lot, third lot, etc.); in the case where said order is not respected, the operations of treatment of the postal objects are interrupted by blocking the acquisition and singulation module 3.

The mail loaded in incorrect chronological order is buffered temporarily, and an indication of wrong sequence is issued. Following upon said indication of wrong sequence, the operator is supplied with an indication of the mail that is to be loaded correctly. The mail kept in the buffer is introduced when the correct resumption of the operations of re-introduction enables restoration of the pre-set sequence.

There is then performed a second step (block 120—final step) of sorting of the lots that have been fed at output by the magnifier M and then re-introduced into the acquisition and singulation module 3; said second sorting step envisages sending of the postal objects having corresponding positions within each lot to one and the same outlet 12; said objects are accumulated in the outlet according to successive delivery points.

For example, sent into the first outlet 12 are all the objects that have the first position within the various lots, i.e.:
1,2,3,4,5 . . . Kn, Sent into the second outlet 12 are all the objects that have the second position within the various lots, i.e.:
Kn+1, Kn+2,Kn+3, Kn+4, Kn+5, . . . , Kn+Kn Sent into the third outlet 12 are all the objects that have the third position within the various lots, i.e.:
2Kn+1,2Kn+2,2Kn+3,2Kn+4,2Kn+5, . . . , 2Kn+Kn Sent into the j-th outlet are all the objects that have the j-th position within the various lots, i.e.:
(j−1)K*n+1,(j−1)K*n+2,(j−1)K*n+3,(j−1)K*n+4,(j−1)K*n+5,(j−1)K*n+Kn The postal objects can now be extracted from the various outlets in so far as they are sequenced, i.e., arranged according to successive delivery points.

By concatenating the contents of the objects present in the first outlet with those present in the second outlet and so forth it may be noted how all the objects are globally sequenced in so far as they have the respective delivery positions:
1,2,3,4,5 . . . Kn(first outlet),
Kn+1,Kn+2,Kn+3,Kn+4,Kn+5, . . . , Kn+Kn (second outlet)
2Kn+1,2Kn+2,2Kn+3,2Kn+4,2Kn+5, . . . , 2Kn+Kn (third outlet)
(j−1)K*n+1,(j−1)K*n+2,(j−1)K*n+3,(j−1)K*n+4,(j−1)K*n+5,(j−1)K*n+Kn (j-th outlet)

Purposely provided virtual points can be introduced into the delivery sequences, without thereby departing from the scope of the method, in order to sort separators or indicators within the ordered stacks or also in order to annul the traffic in given combinations of group, subgroup, and outlet for other types of optimizations.

It may be shown how the aforesaid operations enable provision of the sequencing of n*j*K delivery points. The factor K (i.e., the magnification factor) concurs with the increased capacity of delivery points that can be sequenced as compared to a sequencing performed using traditional methods, where the number of points that can be sequenced in two passes would be n*j. Hence, for K=2 in effect the delivery points that can be sequenced is doubled; for K=3 it is tripled, so forth.

The proposed device co-operates by means of a parallel and sequential process performed by the magnifier M in pipeline mode with the sorter 11 in such a way that the processing time does not substantially change.

The pipeline mode envisages that each lot pre-sorted in the initial step, is forwarded to the sorter for the final step as soon as the next lot enters the intermediate process. This drastically reduces the need for storing within the magnifier M strictly to an amount just exceeding the individual lot at output for receiving also the first letters of the new lot at input.

Finally, the magnifier M requires a reduced addressing capacity, and hence the number of divisions/stations can be considerably reduced as compared to the number of outlets usually necessary for a traditional sorting system. Represented schematically in FIGS. 4, 5 and 6 is an example of system configuration capable of implementing the processes of sorting 100, reprocessing 110, and sorting 120.

As may be seen in FIG. 4, the inlet 15*a* and the outlet 15*b* of the magnifier device M communicate with the path L that extends between the singulator device 3 and the inputs of the outlets 12. A singulator device S is set between the outlets of the forming devices 15 and the outlets 15*b*.

In the course of the sorting step 100 (FIG. 5), the magnifier device M is not used and its inlet 15*a* does not receive postal objects from the path L, and the outlet 15*b* does not feed postal objects to the path L.

In the course of the re-processing step 100 and of the second sorting step 120 (FIG. 6), the magnifier device M is used, and its inlet 15*a* receives postal objects from the path L, whilst the outlets 15*b* feed postal objects to the path L. In this way, the direct path L between the singulator device 3 and the inputs of the outlets 12 is interrupted.

The invention claimed is:

1. A method for sorting postal objects, comprising:
treating sets of grouped postal objects for generating singulated postal objects each of which is physically separated from each other; and
sorting the singulated postal objects by directing each postal object towards a respective selected outlet from among a number n of selectable outlets,
performing a first sorting step, accumulating, within an i-th selected outlet, postal objects belonging to K subgroups having homogeneous delivery points;
carrying out a step of re-processing of the previously sorted postal objects, whereby the postal objects withdrawn from the outlets are treated for forming lots of postal objects; each lot comprising the postal objects belonging to a respective homogeneous subgroup ordered according to successive delivery points; and
performing a second step of sorting of the lots, which provides for sending of the postal objects having corresponding positions within each lot to a respective outlet; the objects are accumulated in the outlet according to successive delivery points and then sequenced, wherein the homogeneous delivery points of the subgroups are defined as:

(L), nK+(L), 2nK+(L), 3nK+(L), . . . , (j−1)*nK+(L)

wherein:

n is the maximum number of the outlets that can be selected in the course of the first sorting step;

j is an indicator of the maximum number of the outlets used in a second step;

K is the magnification factor given by an integer greater than or equal to two;

i is the numeral of the outlet;

(L) is one of the consecutive values {k +(i−1)*K}, where k is the numeral of the subgroup and may assume one of the integer values between 1 and K.

2. The method according to claim 1, wherein in said re-processing step the postal objects are treated for forming ordered sets of overlapping postal objects each of which is aligned with respect to each other in a direction of advance and having corresponding edges spaced apart from one another.

3. The method according to claim 1, wherein said re-processing step comprises:

withdrawing the postal objects from the outlets; and introducing the postal objects into a magnifier module according to a pre-set order, starting from an outlet of lower order (first outlet) and then passing to the outlet of subsequent order (second outlet) and so forth up to the outlet of highest order (n-th outlet).

4. The method according to claim 3, wherein a sequence-verification step is provided to check whether re-introduction of the groups of postal objects into said magnifier module respects a pre-set order; in the case where said order is not respected, the operations of treatment of the postal objects are interrupted by blocking the singulation module.

5. A device for sorting postal objects, comprising:

a singulator module configured for treating sets of grouped postal objects by generating at output singulated postal objects each of which is physically separated from each other; and a sorting device configured for sorting the singulated postal objects by directing each postal object towards a respective outlet selected from among a number n of selectable outlets belonging to the sorting device itself;

control means configured for executing the steps of:

performing a first sorting step, accumulating, within an i-th selected outlet, postal objects belonging to K subgroups having homogeneous delivery points, i.e., consecutive according to the order of delivery;

carrying out a step of re-processing of the previously sorted postal objects, whereby the postal objects withdrawn from the outlets are treated for forming lots of postal objects; each lot comprising the postal objects belonging to a respective homogeneous subgroup ordered according to successive delivery points; and carrying out a second step of sorting the lots, which envisages sending of the postal objects having corresponding positions within each lot to a respective outlet; the objects are accumulated in the outlet according to successive delivery points and then sequenced, wherein the homogeneous delivery points of the subgroups are defined as:

(L), nK+(L), 2nK+(L), 3nK+(L), . . . , (j−1)*nK+(L)

wherein:

n is the maximum number of the outlets that can be selected in the first step;

j is an indicator of the maximum number of the outlets used in a second step;

K is the magnification factor given by an integer equal to or greater than two i is the numeral of the outlet;

(L) is one of the consecutive values {k +(i−1)*K}, where k is the numeral of the subgroup and may assume one of the integer values between 1 and K.

6. The device according to claim 5, wherein the postal objects are withdrawn from the outlets are forwarded to the sorter for the final step while the sorting device operates on a subsequent lot pre-sorted in the initial step.

7. The device according to claim 5, further comprising a magnifier device configured for forming ordered sets of overlapping postal objects aligned in a direction of advance and having corresponding edges spaced apart one from the others; said magnifier device receiving the postal objects withdrawn from the outlets and being designed to form lots of postal objects which are subsequently fed to said singulator module during said second step.

8. A device for sorting postal objects, comprising:

a singulator module configured for treating sets of grouped postal objects by generating at output singulated postal objects each of which is physically separated from each other; and a sorting device configured for sorting the singulated postal objects by directing each postal object towards a respective outlet selected from among a number n of selectable outlets belonging to the sorting device itself;

control means configured for executing the steps of:

performing a first sorting step, accumulating, within an i-th selected outlet, postal objects belonging to K subgroups having homogeneous delivery points, i.e., consecutive according to the order of delivery;

carrying out a step of re-processing of the previously sorted postal objects, whereby the postal objects withdrawn from the outlets are treated for forming lots of postal objects; each lot comprising the postal objects belonging to a respective homogeneous subgroup ordered according to successive delivery points;

carrying out a second step of sorting the lots, which envisages sending of the postal objects having corresponding positions within each lot to a respective outlet; the objects are accumulated in the outlet according to successive delivery points and then sequenced; and a magnifier device configured for forming ordered sets of overlapping postal objects aligned in a direction of advance and having corresponding edges spaced apart one from the others, the magnifier device receiving the postal objects withdrawn from the outlets and being designed to form lots of postal objects which are subsequently fed to the singulator module during the second step.

* * * * *